Aug. 30, 1966     O. I. BERGE     3,269,778
SILO UNLOADERS
Filed July 6, 1965

INVENTOR
ORRIN I. BERGE
BY
Howard W. Bremer
ATTORNEY

United States Patent Office 3,269,778
Patented August 30, 1966

3,269,778
SILO UNLOADERS
Orrin I. Berge, Madison, Wis., assignor to Wisconsin Alumni Research Foundation, Madison, Wis., a corporation of Wisconsin
Filed July 6, 1965, Ser. No. 469,785
4 Claims. (Cl. 302—20)

This invention relates to new and useful improvements in apparatus for unloading silos and more particularly to improvements in silo unloaders of the type having a rotatable silage blower for impelling silage through a stationary silage discharge chute directed out an access opening in the wall of a silo.

As is well known, motorized silo unloaders commonly comprise mechanism which rotates about the axis of the silo, gathering material from the surface of the silage and conveying it to a substantially centrally located blower which impels the material through a discharge chute and out an access opening in the wall of the silo into a vertical chute located along the outside of the silo wall. These silo unloaders are usually either suspended from the top of the silo or supported directly on the surface of the silage.

The unloaders are started by an operator who merely throws a switch located in the barn or silo shed to supply power to the electric motor of the unloader. Thus, preferably, it should not be necessary for the operator to climb up into the silo to start the unloader. However, the accumulation of the plant juices in the form of silage pitch or gum often seriously impedes the operation of presently known silo unloaders, particularly when handling low moisture silage. Thus, farmers sometimes find it necessary to climb up into their silos several times daily in order to remove these deposits of silage juices. Some farmers have even abandoned the practice of making low moisture silage because of the inability of presently known silage unloaders to handle the low moisture silage.

Since these silage juices are water soluble, the device of this invention permits the introduction of water or water solutions into the blower housing of the silage unloader while the unloader is operating to dissolve the gum-like deposits of silage juices therein to facilitate easy starting and unimpeded operation of the silage unloader.

An object of this invention is to provide a means for maintaining the blower of a motorized silage unloader free from deposits of silage juices to facilitate easy starting and unimpeded operation of the unloader.

More particularly, an object of this invention is to provide an improvement in motorized silage unloaders which permits the introduction of water or water solutions into the revolving blower housing of the silo unloader to prevent the build up of gum-like deposits of silage juices.

Other objects, features, and advantages of this invention will be apparent from the following detailed description taken in conjunction with the accompanying drawings wherein a preferred embodiment of the principles of the invention has been selected for exemplification.

In the drawings:
FIG. 1 is an exploded perspective view showing the cover and trough portions of this improvement in motorized silo unloaders.

Figure 1:
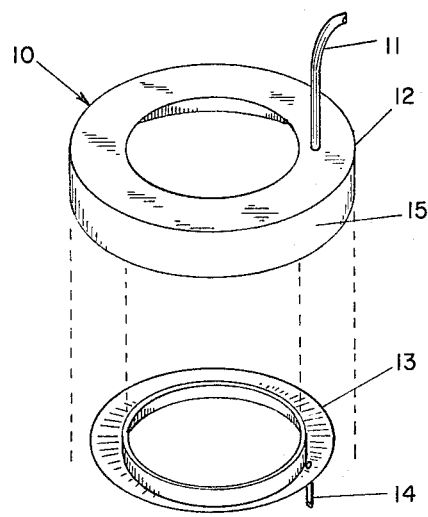

Referring now more particularly to the drawings wherein like numerals designate like parts throughout the several views, this improvement which is generally shown at 10 in FIG. 1, has a fluid inlet conduit 11 mounted in an annular cover portion 12 and an annular trough portion 13 having a fluid discharge conduit 14 depending therefrom.

Figure 2:
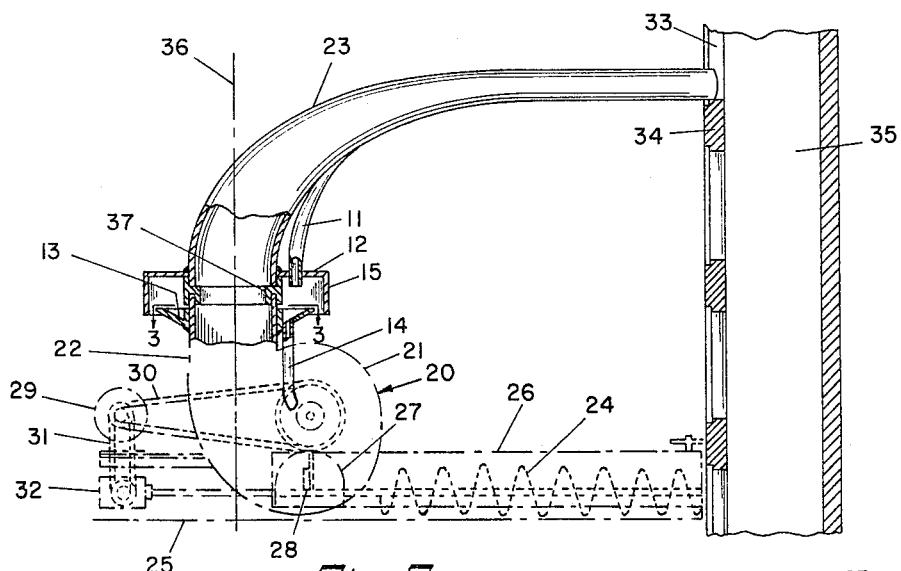
FIG. 2 is a side elevational view showing, diagrammatically, a silo unloader provided with the improvement of this invention which is shown in cross section thereon.

FIG. 2 shows, diagrammatically, a silo unloader at 20. Unloader 20 has a silage blower unit 21 having a discharge housing 22 for impelling silage into a silage discharge chute 23. The silo unloader 20 has an auger 24 which rests on the surface of the silage 25 and has housing 26 against which the auger works for gathering material from the surface of the silage and depositing it at the inlet 27 in the blower housing. The silage is propelled by paddles or impeller blades 28 through the discharge chute 23. The blower 21 and the auger 24 ared riven, respectively, from an electric motor 29 by an endless V-belt 30, and from V-belt 31 and miter gear box 32.

The silo unloader 20 operates as follows: The auger 24 gathers material from the surface of the silage 25 and deposits it at the inlet 27 in the blower housing. The impeller blades or paddles 28 of the blower 21 propel the silage through the discharge housing 22 of the blower, the discharge chute 23, the access opening 33 in the wall of the silo 34 and into the vertical chute 35 located on the outside of the silo wall. Although not shown in the drawings, means are provided for rotating the blower 21, the auger 24, the housing 26, and motor 29 as a unit in a substantially horizontal plane about the vertical axis 36 of the silo 34 so that the auger 24 may swing 360° over the entire surface of the silage. Silage discharge chute 23 which is mounted in bushing 37 on the discharge housing 22 of blower 21 does not rotate, but remains directed through the access opening 33 in the wall of the silo.

It should be understood that the silo unloader and the operation thereof just described is conventional and merely exemplary of the environment to which this invention pertains. The unloader 20 could be of the type which is suspended from a cable or supported on the surface of the silage, and the gathering means could be a pair of augers rather than single auger 24 or any other suitable gathering means. It is not intended that the improvements of this invention be limited to use with silo unloaders having the particular gathering and impelling means shown in the drawings.

Figure 3:
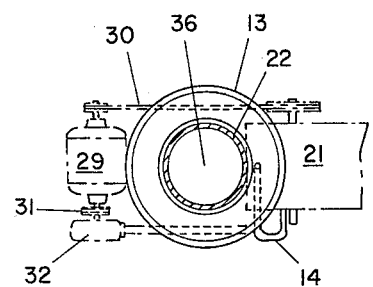
FIG. 3 is a cross sectional plan view taken along line 3—3 of FIG. 2 showing, diagrammatically, a silo unloader having the trough portion of this invention mounted thereon.

As best seen in FIGS. 2 and 3, the annular trough portion 13 of this improvement is adapted to be fixedly secured about the discharge housing 22 of blower 21 for rotation therewith in a horizontal plane about vertical axis 36 of silo 34. The generally V-shaped trough 13 shown in the drawings is made of sheet metal and is welded to the discharge housing 22 of blower 21. Other suitable materials and means of attachment may, of course, be employed without departing from the principles of this invention.

The trough 13 has a fluid discharge conduit 14 depending therefrom and connecting into the side of the blower housing. Conduit 14 may be made of flexible or rigid tubing.

The annular sheet metal cover portion 12 has a downwardly extending flange portion 15 and is fixedly secured to the lower end of the non-revolving silage discharge chute 23 so as to extend outwardly over and downwardly around the trough portion 13 for preventing silage or debris from entering said trough portion and clogging the fluid discharge conduit 14.

A fluid inlet conduit 11 extends through the cover portion 12 for admitting fluid into the trough 13 as the trough rotates with the blower 21 during operation of the silo unloader. Fluid inlet conduit 11 may take the form of a flexible hose or a substantially rigid pipe.

Inlet conduit 11 may be suspended from discharge chute 23 by any suitable means.

Inlet conduit 11 may be connected into the regular water supply for the barn and may be controlled by a manually operable valve (not shown) preferably located immediately adjacent the switch (not shown) for stopping and starting the electric motor 29. If desired, instead of providing a manually operable valve for controlling the flow of water to inlet conduit 11, a control valve may be provided which will be automatically opened when the control switch for the electric motor 29 is turned on and which will be turned off when said switch is turned off.

In operation, when the slip unloader is started, the water control valve may be opened either automatically or manually so that water will be supplied to the blower 21 for maintaining the blower free of deposits of silage juices. The water will be supplied through inlet conduit 11 which extends through cover 12 which is fixedly mounted on the stationary silage discharge chute 23. The water is thus supplied to the revolving trough 13 from which it flows through discharge conduit 14 into the blower housing.

While the build up of deposits from silage juices is most often encountered in the blower portion of a silo unloader, such deposits can also occur in other parts of the unloader mechanism and this invention also finds application in such instances. For example, silage juice deposits may build up on the auger 24. To correct such a situation trough 13 may be supplied with one or more additional fluid discharge conduits through which the silage juice deposit-dissolving solutions can, by any suitable means, be directed into the auger housing 26 and upon auger 24. Thus, the solutions can be directed against the flights of the auger over its full length by means of a conduit having spaced perforations along its length mounted within housing 26. Alternatively a single fluid discharge conduit from trough 13 can be provided to which is attached perforated conduit means whereby the deposit-dissolving solutions can be directed into the blower housing as hereinbefore described and into the other portions of the unloading apparatus simultaneously.

While the deposits of silage juices which ordinarily build up in conventional silage unloaders are water soluble, it is recognized that other solutions, or aqueous solutions containing various additives to enhance their deposit-dissolving efficacy may also beneficially be employed.

It is understood that this invention is not confined to the particular construction and arrangement of parts herein illustrated and described, but embraces all such modified forms thereof as may come within the scope of the following claims.

It is claimed:

1. An improvement in silo unloaders having a rotatable silage blower for impelling silage into a silage discharge chute, said improvement comprising:
   (a) a trough fixedly mounted on said silage blower for rotation therewith,
   (b) means for conveying fluid to said trough, and
   (c) means for discharging the fluid from said trough into said silage blower for dissolving deposits of silage juices in said blower.

2. An improvement in silo unloaders having a rotatable silage blower for impelling silage into a silage discharge chute, said improvement comprising:
   (a) a trough fixedly mounted on the discharge housing of said silage blower for rotation therewith,
   (b) a fluid inlet mounted on the lower end of said silage discharge chute for conveying fluid to said trough, and
   (c) a discharge conduit depending from said trough for conveying fluid from said trough into said silage blower for dissolving deposits of silage juices therein.

3. An improvement in silo unloaders having a rotatable silage blower for impelling silage into the lower end of a silage discharge pipe, said improvement comprising:
   (a) an annular trough encircling the discharging housing of said silage blower and being fixedly attached thereto for rotation therewith,
   (b) an annular cover fixedly attached to the lower end of said silage discharge pipe and extending outwardly over said annular trough,
   (c) first conduit means attached to said cover for conveying fluid to said trough, and
   (d) second conduit means for discharging fluid from said trough into said silage blower for dissolving deposits of silage juices therein.

4. The improvement in silo unloaders as specified in claim 3 wherein said cover has a depending flange portion extending around the outer periphery of said annular trough for preventing silage from entering said trough and clogging second conduit means.

References Cited by the Examiner

UNITED STATES PATENTS

| | | | |
|---|---|---|---|
| 1,465,438 | 8/1923 | Hollinger | 302—20 |
| 1,792,590 | 2/1931 | Kirk | 302—20 |
| 2,901,293 | 8/1959 | Jeanne | 302—20 |

EVON C. BLUNK, *Primary Examiner.*

A. H. NIELSEN, *Assistant Examiner.*